United States Patent
Gonzalez

(10) Patent No.: US 7,757,604 B2
(45) Date of Patent: Jul. 20, 2010

(54) SMOKE ENHANCER

(75) Inventor: Mario Mata Gonzalez, Kenosha, WI (US)

(73) Assignee: Weber-Stephen Products Co., Palatine, IL (US)

( * ) Notice: Subject to any disclaimer, the term of this patent is extended or adjusted under 35 U.S.C. 154(b) by 1226 days.

(21) Appl. No.: 11/273,845

(22) Filed: Nov. 15, 2005

(65) Prior Publication Data

US 2007/0107607 A1 May 17, 2007

(51) Int. Cl.
*A23B 4/044* (2006.01)
(52) U.S. Cl. .......................................... 99/482; 99/467
(58) Field of Classification Search ........... 99/339–340, 99/467–479, 483, 481–482, 444–450; 126/25 R, 126/41 R, 9 R, 26, 540–541
See application file for complete search history.

(56) References Cited

U.S. PATENT DOCUMENTS

| 1,118,501 | A | * | 11/1914 | Laughlin | 126/541 |
| 1,779,453 | A | * | 10/1930 | Taylor | 126/59.5 |
| 3,002,444 | A | * | 10/1961 | Hoebing | 99/352 |
| 4,130,052 | A | * | 12/1978 | Jacobson | 99/339 |
| 4,140,049 | A | * | 2/1979 | Stewart | 99/483 |
| 4,203,719 | A | * | 5/1980 | Brandt | 431/352 |
| 4,321,857 | A | | 3/1982 | Best | 99/340 |
| 4,374,489 | A | | 2/1983 | Robbins | 99/482 |
| 4,697,506 | A | | 10/1987 | Ducate, Jr. | 99/482 |
| 4,779,525 | A | | 10/1988 | Gaines | 99/482 |
| 4,869,163 | A | | 9/1989 | Haskins | 99/482 |
| 5,048,406 | A | | 9/1991 | Cofer | 99/482 |
| 5,167,183 | A | | 12/1992 | Schlosser et al. | 99/482 |
| 6,000,319 | A | | 12/1999 | Treiber | 99/482 |
| 6,019,035 | A | | 2/2000 | Jonas et al. | 99/482 |
| 6,041,695 | A | | 3/2000 | Koupus | 99/428 |
| 6,059,849 | A | | 5/2000 | Lewis | 44/530 |
| 6,102,028 | A | | 8/2000 | Schlosser et al. | 126/41 |
| 6,161,534 | A | | 12/2000 | Kronman | 126/41 |
| 6,257,130 | B1 | | 7/2001 | Schlosser | 99/482 |
| 6,523,463 | B1 | | 2/2003 | Hogle | 99/482 |
| 6,701,829 | B2 | | 3/2004 | Farrow | 99/482 |
| 7,344,173 | B2 | * | 3/2008 | Gonzalez et al. | 294/27.1 |
| 2002/0166460 | A1 | | 11/2002 | O'Shea | |
| 2005/0051038 | A1 | | 3/2005 | Bartelick | |

* cited by examiner

*Primary Examiner*—Thor S Campbell
*Assistant Examiner*—Vinod D Patel
(74) *Attorney, Agent, or Firm*—David I. Roche; Daniel A. Tallitsch; Baker & McKenzie LLP

(57) ABSTRACT

The inventions disclosed herein relate to a smoke generating device for use with portable grills. Various embodiments of the smoke generating devices disclosed herein incorporate some combination of a number of features to solve the problem of prior art smoke generating devices. For example, a various embodiments of the present inventions incorporate some combination of means for mounting the device in a lower portion of a barbecue grill to allow the device to benefit from fresh air which enters the grill in the lower portion, an ignition bar for transferring heat from the burner to the smoker particles by conduction, convection, and radiation, a cover which extends in the vicinity of the flame emanating from the burner tube for transferring heat from the burner tube to the smoker particles by conduction, convection and radiation, louvers on air inlets for preventing the smoker particles from blocking the inlet of air, and legs which contact the flames emanating from the burner tube from transferring heat from the burner tube to the smoker particles by conduction.

20 Claims, 5 Drawing Sheets

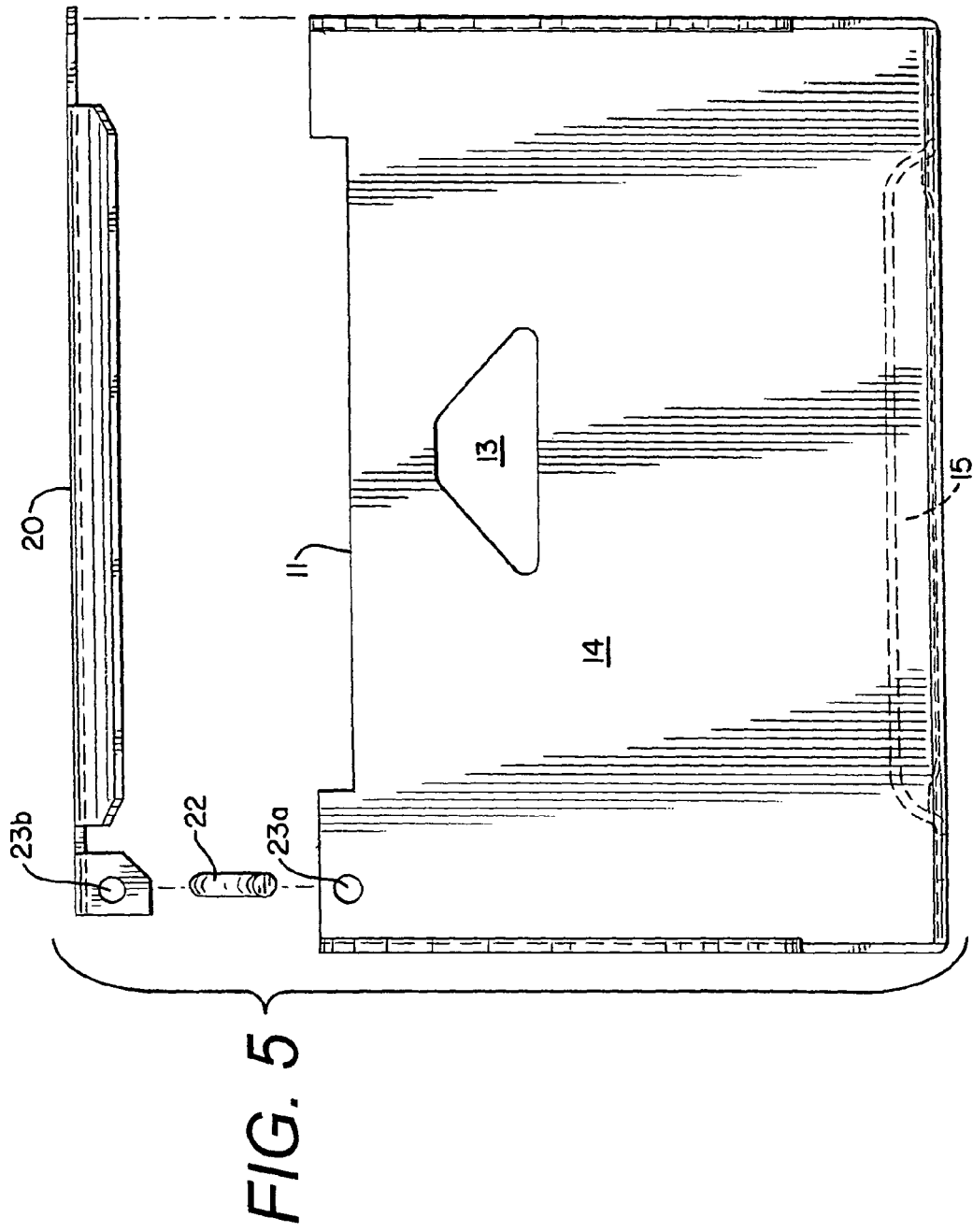

SMOKE ENHANCER

BACKGROUND OF THE INVENTIONS

The inventions described and claimed herein relate generally to smoking food on outdoor cooking devices. In particular, the inventions relate to add-on smoker devices for gas barbecue grills, although the inventions are not limited as such.

Smoking foods usually involves slowly cooking large cuts of meat in the presence of a heat source or fire, which usually takes twelve to fourteen hours. The smoking process imparts a natural smoke flavor to the food. Charcoal briquettes can be used to smoke foods, but many consumers prefer to use aromatic wood chips such as hickory, mesquite, maple or apple. For quite some time, the options for obtaining wood smoked foods were limited. A consumer could either purchase commercially smoked foods or could purchase a smoker, which is a specialized outdoor cooker especially designed for smoking foods. Smokers were not especially popular, likely because of the time required to use a smoker. Additionally, most consumers already possess a barbecue grill and may be unwilling to spend money on a second outdoor cooking device.

Recent developments in the art of barbecue grills, however, allow owners of barbecue grills to enhance the flavor of cooked foods with smoke. Manufacturers have developed smoke generating devices that are designed to be used as an accessory for a barbecue grill. In the case of a gas grill, because of the flexibility in regulating the temperature of a barbecue grill, the length of time needed to cook foods while still imparting a smoke flavor could be reduced significantly, to about one hour. Most devices comprise a box or container for holding wood chips which is inserted into the cooking chamber of the grill. In some cases, the smoke generating device is provided with auxiliary heating means for heating the wood chips to the kindling temperature. In other cases, the smoke generating device simply utilizes the pre-existing heat source of the barbecue grill. In the latter case, the smoke generating device is placed in an upper portion of the cooking chamber, either on top of the cooking grate or on top of sear bars. For examples of such devices, see U.S. Pat. Nos. 5,167,183, 6,102,028, and 6,257,130, which are assigned to the Assignee of the present invention and are incorporated herein by reference.

While the smoke generating devices of the prior art provide adequate smoke for smoking of foods, the prior art does have its drawbacks. For instance, the prior art devices are large and are generally designed to be placed on top of the cooking grate or on top of sear bars. In the former case, the smoke generating device reduces the area of available cooking surface. In the latter case, the smoke generating device is disposed between the heat source and the cooking surface, which reduces the area of the cooking surface that can be used for direct cooking of foods; i.e. food that is placed on the cooking surface above the smoker will be indirectly cooked. Reducing the available area for cooking foods can be especially troublesome in smaller portable grills, such as the Weber® Q™ compact barbecue grill, which can be viewed at www.weber.com. Accordingly, there is a need for a smoke generating device that does not reduce the cooking surface area or the cooking surface area that can be used for direct cooking of foods.

Another drawback is that many of the prior art smoke generating devices are designed to be placed on top of sear bars for a gas barbecue grill and, unfortunately, many gas barbecue grills do not have sear bars. Generally, this is an issue with the smaller compact barbecue grills. Consequently, there is a need for a smoke generating device which can be adapted for use with a grill lacking sear bars.

A further drawback of the prior art smoke generating devices is that they are generally disposed in a location where they will not receive fresh air, which can reduce the effectiveness of the smoke generating device. Fresh air generally enters a barbecue grill from the bottom. The fresh air must pass by the heat source, whether it be charcoal, propane, or other fuel, before it reaches the smoke generating device. Combustion of fuel utilizes the oxygen in the fresh air which has the effect of starving the smoke generating device of fresh air. As a result, there is a need for a smoke generating device that is adapted to receive fresh air.

Even further, it has been found that it is difficult to control the temperature of prior art smoke generating devices. Excessive temperatures can lead to ignition of wood particles, an excessive consumption rate of wood chips, and/or uneven consumption of wood particles. To prevent ignition, it is often necessary to reduce the temperature of the grill. Consequently, it takes longer to cook the food. Therefore, there is a need for a smoke generating device that is adapted to prevent ignition of wood particles and thus allow flexibility in selection of cooking chamber temperature.

SUMMARY OF THE INVENTIONS

The inventions disclosed herein solve at least some of the problems of the prior art. Various embodiments of the present inventions are disclosed which incorporate one or more components or characteristics. For example, in a first embodiment, a smoke generating device is adapted to be located lateral to the heat source in a lower portion of the cooking chamber. As such, the smoke generating device is not disposed between the heat source and the cooking surface, providing maximum surface area for cooking of foods. In a second embodiment, a smoke generating device is adapted to engage with the burner tubes of a gas barbecue grill such that the smoke generating device can be used in a barbecue grill lacking sear bars. In a third embodiment, a smoke generating device incorporates inlets below the heat source for receiving fresh air. In a fourth embodiment, a smoke generating device incorporates louvers on air inlets for preventing wood chips from blocking the air inlets. In a fifth embodiment, a smoke generating device incorporates inlets which are appropriately sized to prevent ignition or excessive consumption of smoker particles. In a sixth embodiment, a smoke generating device incorporates features adapted to transfer heat to the wood chips by conduction, convection, and radiation to provide even heat to and even consumption of smoker particles.

BRIEF DESCRIPTION OF THE DRAWINGS

These and other features, aspects, objects, and advantages of the inventions described and claimed herein will become better understood upon consideration of the following detailed description, appended claims, and accompanying drawings where:

Figure 1:
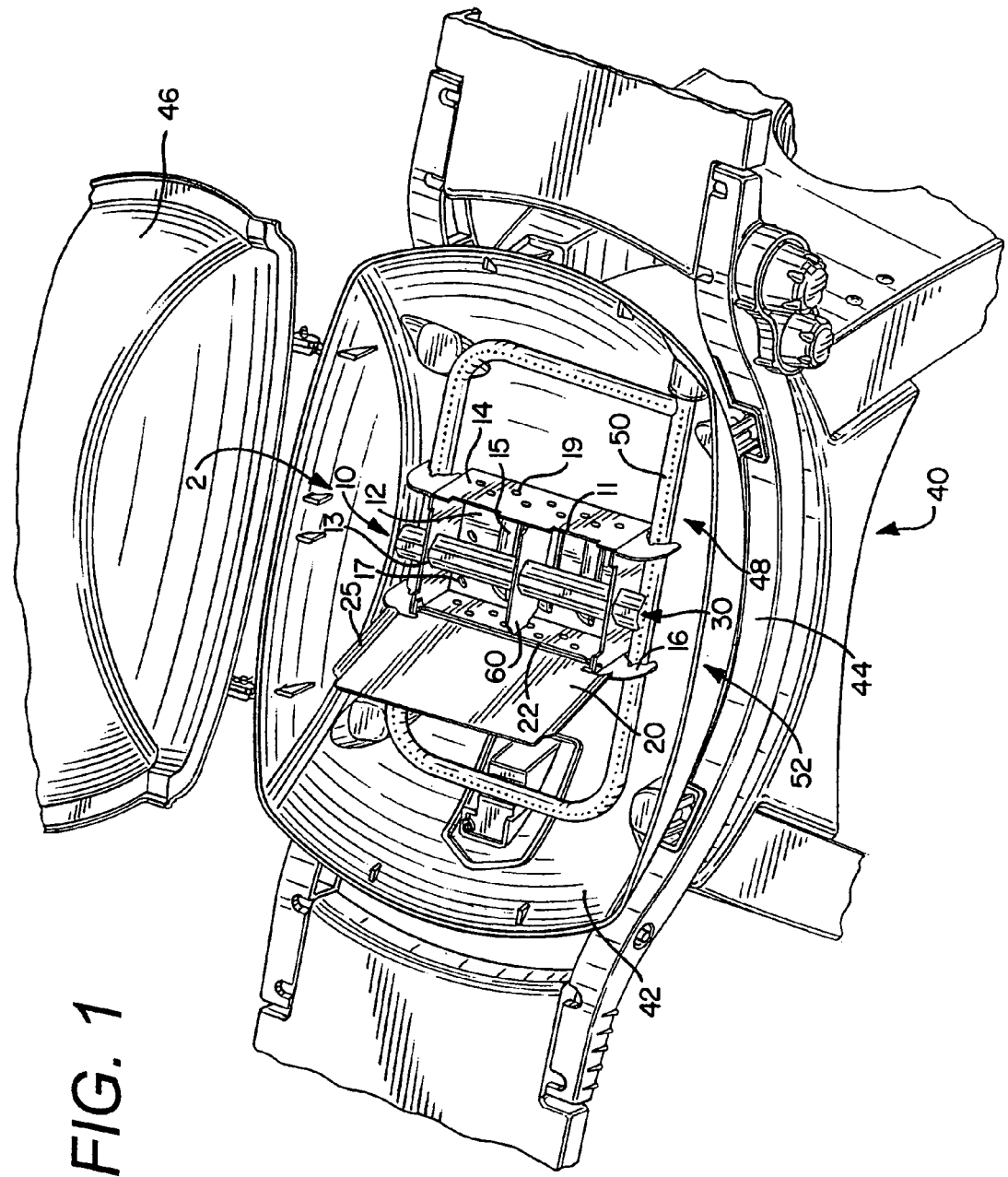
FIG. 1 is a perspective view of a preferred embodiment of the smoke generating device installed in the cooking chamber of a barbecue grill.

It should be understood that the drawings are not necessarily to scale and that the embodiments are sometimes illustrated by graphic symbols, phantom lines, diagrammatic representations and fragmentary views. In certain instances, details which are not necessary for an understanding of the inventions described and claimed herein or which render other details difficult to perceive may have been omitted. It should be understood, of course, that the inventions described herein are not necessarily limited to the particular embodiments illustrated herein.

Like reference numerals will be used to refer to like or similar parts from Figure to Figure in the following description of the drawings.

DETAILED DESCRIPTION OF THE DRAWINGS

Referring first to FIG. 1, a preferred embodiment of the smoke generating device 2 is shown installed in the lower portion of a barbecue grill 40. The particular style of barbecue grill 40 depicted in this figure is for example purposes only. It is contemplated that a person of ordinary skill in the art would know how to modify the various embodiments of the smoke generating device described herein for use with other types barbecue grills, including non-gas fired grills. The particular grill 40 depicted in this figure is comprised of a cooking chamber 42 which is defined by a lower member 44 and an upper member 46. The upper member 46 is a lid which can be removable from the lower member 44 or hingedly attached to the lower member 44, as shown. The heat source for the barbecue grill 40 is a burner tube 48 having a plurality orifices 50 for combustion of a fuel such as propane. The barbecue grill 40 also comprises an air inlet 52 (on the underside of the grill) for receiving fresh air into the grill and a cooking grate (not shown) which is located above the burner tube 48 near the lip of the lower member 44.

In FIG. 1, the device 2 is shown in engagement with two parallel sections of the burner tube 48 for supporting the device 2 in the lower portion of the grill 40. Although shown in engagement with a single P-shaped burner tube 48, the device 2 can be used with barbecue grills having multiple burners or a single burner of a different shape. And, while the device 2 is shown engaged with two parallel burner tube sections, the device 2 can alternatively be engaged with two burner tube sections that are not parallel. For example, the device 2 could be engaged with two burner tube sections that are oriented at 90° from one another, or even any other angle. Even further, assuming rigid support is provided, the device 2 could be cantilevered from a single burner tube section.

The smoke generating device 2 is preferably comprised of a smoker box 10, a cover 20, and an ignition bar 30. The smoker box 10 is adapted to contain smoker particles (not shown) such as wood particles, charcoals, or any other material which would create smoke or vapors in the presence of heat for adding flavor to barbecued foods. The cover 20 is preferably hingedly attached to the smoker box using a wire hinge 22 for providing easy access to the smoker box 10. The wire hinge preferably engages with two opposing holes 23a in the smoker box 10 and two corresponding opposing holes 23b in the cover 20 for attaching the cover 20 to the smoker box 10. A tool such as tongs or a spatula can be easily used to flip the cover open and closed in the event that additional smoker particles were needed while the grill was hot or in the event that the user wants to prevent getting his hands dirty. However, it is contemplated that the cover 20 could be designed to be removable from the smoker box 10, wherein the cover 20 can nest on top of the smoker box 10. Alternatively, the cover 20 could be slidingly attached to the smoker box 10. A person of ordinary skill in the art would recognize that the cover 20 can be attached to the smoker box 10 in a multitude of ways.

The smoker box 10 preferably comprises a floor 12, a plurality of side walls 14, and a plurality of legs 16. The smoker box 10 is preferably formed from a single sheet of metal wherein the sheet of metal is stamped and bent into shape, although the invention is not limited as such. For example, each component 12, 14, and 16 could be discrete components that are attached together by appropriate means such as welds, bolts, screws, etc. It is preferred that the smoker box 10 is rectangular shaped, although it is contemplated that the box 10 can be any other shape; i.e. circular, triangular, trapezoidal, oval, etc. In some cases, the shape of the smoker box 10 may be dictated by the design of the barbecue grill 40. In the event that the box 10 is circular or curvilinear, only one continuous side wall 14 may be needed.

The legs 16 extend from an outside surface of the smoker box, and preferably extend from opposing side walls 14, for supporting the box in a lower portion of the grill 40, near the air inlet 52. Positioning the box 10 in the lower portion of the grill, near the air inlet 52, allows fresh air to enter the box 10 for more efficient production of smoke and slower rate of consumption of smoker particles. As discussed above, prior art smoke generating devices 2 are positioned above the burner tube 48 such that the device 2 receives post-combustion air with a lower oxygen content which is believed to inhibit smoke generation. Preferably, the legs 16 position the box 10 adjacent to the burner tube 48 such that the floor 12 of the box 10 is positioned below the orifices 50 on the burner tube 48. However, it is contemplated that the floor 12 can be positioned a short distance above the orifices 50 and still receive fresh air, so long as the box 10 is horizontally disposed from the burner tube (i.e. not directly above the burner tube 48).

In the preferred embodiment, there are four legs 16, each having generally circular recesses for engaging with circular burner tube sections 48. However, the shape of the recesses are, for the most part, dictated by the shape of the burner tube 48; i.e. if the burner tubes 48 have a square cross section, then the recesses should also be square. The legs 16 are preferably thin and generally vertically oriented such that the burner tube sections 48 receive the legs between ports (or orifices) 50. It is not necessary for the legs 16 to engage with the burner tubes. A person of ordinary skill in the art would recognize that the legs could engage or rest on any other surface in the lower portion of the lower member 44. It is also contemplated that, as a substitute for the legs 16, other mounting means such as brackets, clamps, bolts, etc. can be used for mounting the box 10 to the lower member 44, the burner tube 48, or any other component inside of the lower member 44. Alternatively, support surfaces (not shown) could be formed in the lower member 44 for supporting the smoker box 10, wherein the support surfaces would engage with any portion of the box, including the floor 12 or the side walls 14.

In the preferred embodiment, the legs 16 are used for transferring heat to the smoker particles. As described above, the preferred legs 16 are in contact with the burner tube in the region of the orifices 50. The flames emanating from the orifices transfer heat to the legs 16, which in turn transfer heat by conduction to the floor 12 and side walls 14, which finally transfer heat to the smoker particles by conduction. Conduction heat transfer occurs due to the contact between the smoker particles and the floor 12 and side walls 14.

Figure 2:
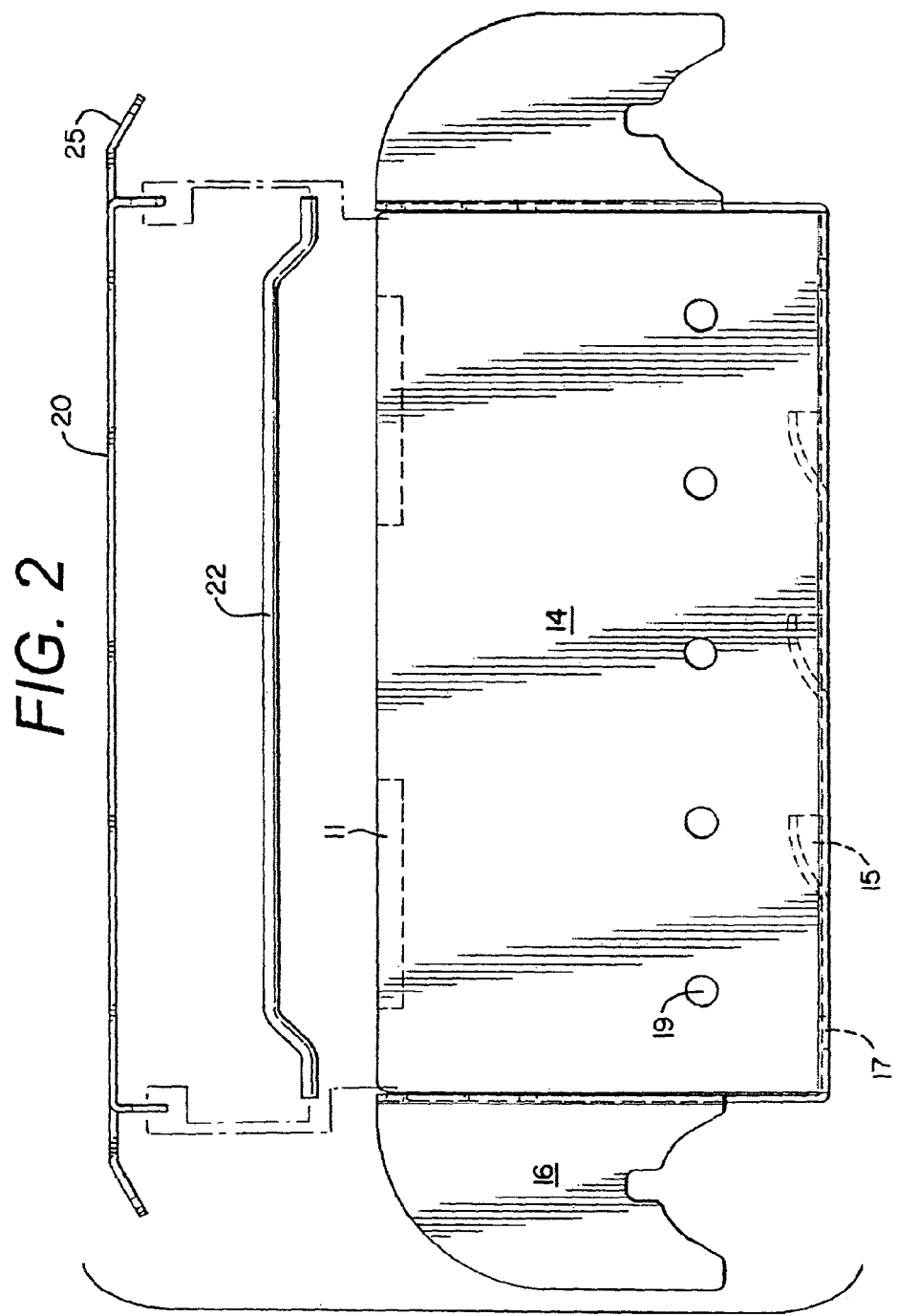
FIG. 2 is an exploded front view of a preferred smoke generating device.
Figure 3:
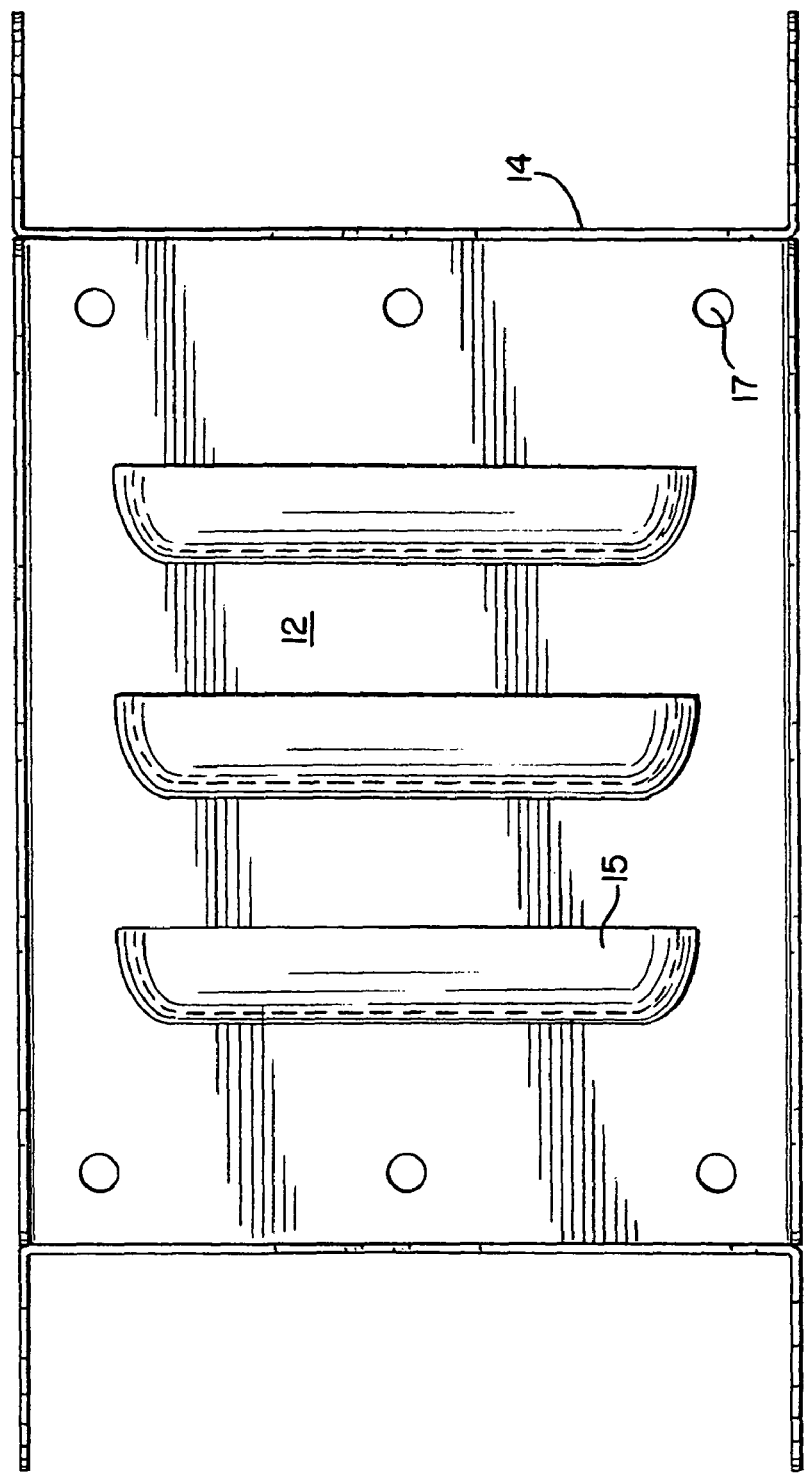
FIG. 3 is a top view of the smoker box component of a preferred smoke generating device.
Figure 4:
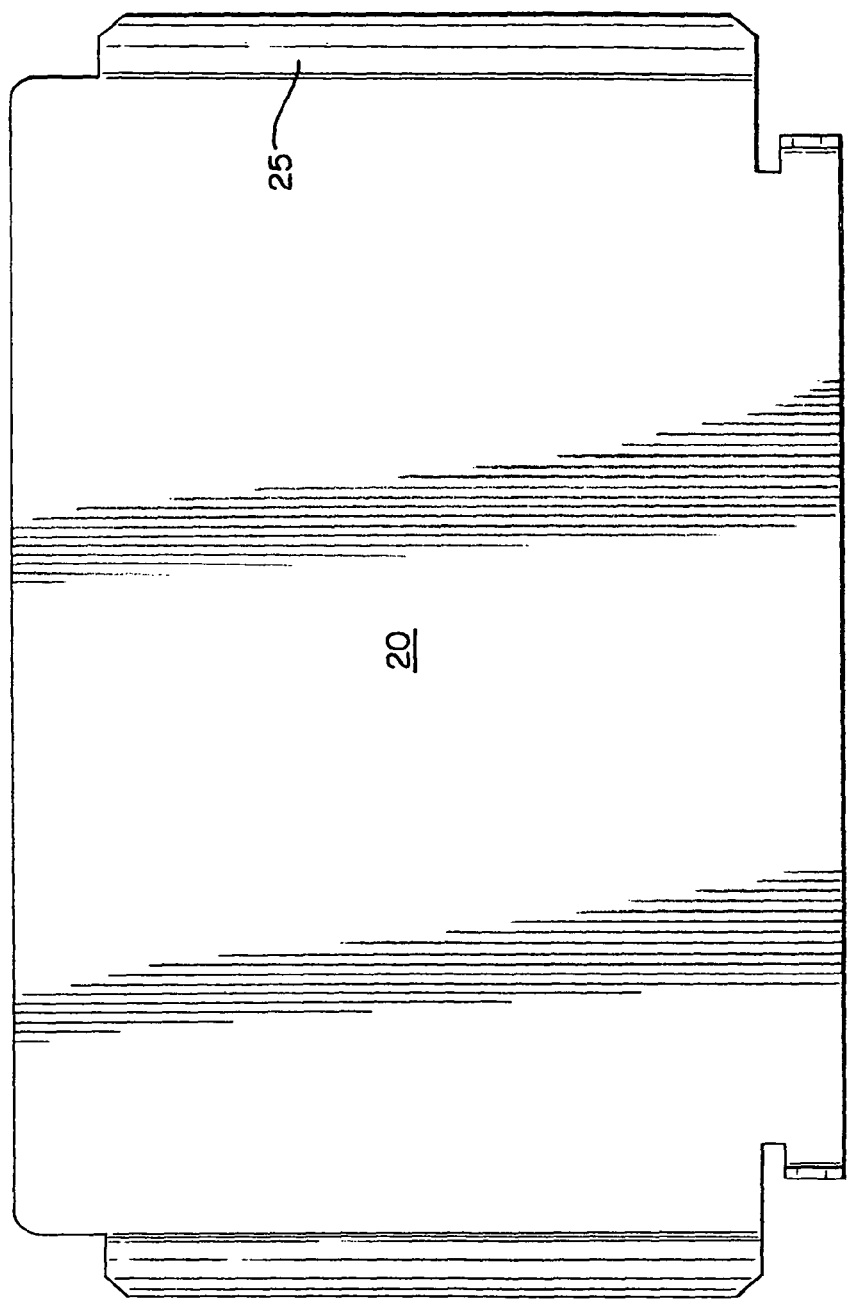
FIG. 4 is a top view of the lid component of a preferred smoke generating device; and, FIG. 5 is an exploded side view of a preferred smoke generating device.

The smoker box 10 also comprises a number of vents for the intake of air and the exhaust of smoke. As best shown in FIG. 3, the floor 12 preferably has at least one and preferably nine inlets 15, 17 and, as best shown in FIG. 2, the side walls have a plurality of circular vents 19. Of the nine inlets 15 and 17, it is preferred that six of the inlets are circular holes 17 and three of the inlets are elongated slots 15. The elongated slots 15 are preferably characterized as louvers wherein the louvers inwardly protrude into the interior space of the smoker box 10. As such, the louvers help keep the smoker particles elevated off of the floor 12 thus preventing the smoker particles from blocking the incoming air. The plurality of vents 19 on the side walls 14 are available for intake of air or for exhaust of smoke, which depends upon a number of factors such as the temperature, the particular location of the vent 19 on the side wall 14, and the direction of convective drafts in the grill 40.

It is understood that smoke from the box 10 will generally rise due for convective forces. Accordingly, smoke outlets 11 are preferably formed in an upper portion of the device. Outlets 11 may be located in a lower portion of the device, but this may suffocate the smoker particles. This may be desirable to an extent to slow down consumption of smoker particles, however. Preferably, the outlets 11 are formed at the interface between the cover 20 and the side walls 14 of the box. As depicted in FIGS. 1, 2, and 5, the side walls 14 have a plurality of cut-outs on the top edge. However, it is contemplated that the cut-outs could be formed on the cover 20 instead of the side walls 14. As an alternative to the outlets 11 formed at the interface of the side walls 14 and the cover 20, holes could be formed in the cover 20 and/or on the side walls 14 near the top edge of the side walls 14.

Referring again to FIG. 1, the ignition bar 30 is one of the primary sources of heat for the smoker box 10. The ignition bar 30 preferably is formed out of sheet metal and extends throughout the interior of the smoker box 10, passing through openings 13 in opposing side walls 14 of the box 10, and extending outwardly from the box 10. The openings 13 are better shown in FIG. 5. Referring back to FIG. 1, in certain embodiments of the present invention, the device 2 may also comprise a box divider 60 having a corresponding opening 13 for providing additional support for the ignition bar 30 and creating two distinct compartments in the smoker box 10. As depicted in FIG. 1, the ignition bar 30 extends outside the box 10 on both sides directly over the two burner tube sections 48. The flame (not shown) emanating from the burner tube 48 heats the ignition bar 30 to a very high temperature, such that the ignition bar 30 radiates heat along its entire length to smoker particles inside of the box 10. In the event that the smoker box 10 is sufficiently filled with smoker particles, the ignition bar 30 will also conduct heat to the smoker particles. It is contemplated that the ignition bar 30, being in generally direct contact with the burner 48 flames, can be the hottest surface of the device 2. Consequently, the ignition bar 30 will facilitate convective drafts inside of the smoker box to enhance heat transfer to the smoker particles. In addition, the ignition bar 30 is preferably shaped like an inverted-V for capturing hot gas rising from the burner tube 48 and directing the hot gas into the smoker box 10 through the openings 13 such that the ignition bar 30 further enhances convective heat transfer to the smoker particles. However, it is understood that a person of ordinary skill in the art would understand that the ignition bar 30 could be embodied in a multitude of shapes and sizes.

As shown best in FIGS. 1 and 2, the cover 20 preferably has two opposing downturned portions 25 for effective distribution of smoke. Smoke generally exits the vents 11 with significant lateral velocity. This is desired along the widest axis of the grill 40, where it is desired for smoke to travel laterally and upwardly. Consequently, it is preferred that the other two sides of the cover do not have downturned portions. However, along the narrowest axis of the grill 40, it is preferred for the smoke to travel generally upwardly to prevent smoke from riding up the wall of the lower and upper members 44, 46 and bypassing the cooking surface. The downturned portions 25 convert lateral velocity into downward velocity, wherein the convective drafts force the smoke upwardly past the cooking surface. It is contemplated that the downturned portions 25 can contribute to the heat transfer to the smoker particles. Preferably, the downturned portions 25 extend outside the periphery of the smoker box 10 in the vicinity of the flames, which originate from the burner tube. The flames transfer heat to the downturned portions 25, which elevates the temperature of the entire cover 20. The cover 20 transfers heat to the smoker particles by conduction, convection, and radiation. Assuming the smoker box 10 is sufficiently filled with smoker particles, the smoker particles will contact the cover 20 facilitating conduction heat transfer. The cover 20 will also contribute to convection heat transfer because the hot surfaces of the cover 20 will facilitate convective drafts inside of the smoker box 10. It is contemplated that the cover 20 will reach high temperature due to the downturned portions 25 being in the vicinity of the flames, which facilitates a significant amount of radiation heat transfer to the smoker particles.

To use the preferred smoke generating device 2, the cooking grate of the grill 40 is first removed and the device 2 is mounted onto the burner tube 48 to take advantage of the fresh air coming in from beneath the grill 40. The cover 20 of the device 2 is opened and pre-soaked smoker particles (preferably wood chips) are added into the smoker box 10. The cover 20 is closed and the cooking grate is replaced. The grill 40 is pre-heated on high heat for approximately 10 minutes. During this period of time, the damp wood chips utilize heat through conduction, convection, and radiation means to initiate the smoking process. Use of all three modes of heat transfer is unique in that it results in quick initiation of the smoking process and results in even heating of the smoker particles. The device 2 initially heats up through conduction at the legs 16, from conduction, convection and radiation at the ignition bar 30, and from conduction, convection and radiation at the downturned portions 25 of the cover 20. Air is brought in through the air inlets 15, 17, and 19. Smoke exits the device 2 at vents 11. Besides letting air into the smoker box 10, the louvers on the air inlets 15 help keep the wood chips off of the floor 12, thus preventing the wood chips from blocking the incoming air. During the initial 10 minute preheat, the wood chip's temperature preferably rises to a temperature at or below the kindling temperature to start the smoking process.

Although the inventions described and claimed herein have been described in considerable detail with reference to certain preferred embodiments, one skilled in the art will appreciate that the inventions described and claimed herein can be practiced by other than the preferred embodiments, which have been presented for purposes of illustration and not of limitation. Therefore, the spirit and scope of the appended claims should not be limited to the description of the preferred embodiments contained herein.

I claim:

1. A smoke generating device for a barbecue grill having a cooking chamber and a burner tube section in the cooking chamber, the smoke generating device comprising:

a smoker box, a cover, and an ignition bar extending outwardly and inwardly of the smoker box;

the smoker box having a floor and a plurality of walls;

the smoker box and the cover defining an interior space;

the smoker box being adapted to hold an at least one smoker particle in the interior space;

at least one support extending from the smoker box and being adapted to engage with the burner tube section to hold the smoker box such that the ignition bar is disposed in a position above a portion of the burner tube section to transfer heat to the ignition bar when the burner is operating;

the floor having an at least one opening for receiving an air into the smoker box;

the at least one opening having an inwardly protruding louver for elevating the at least one smoker particle off of the floor; and the smoker box having an at least one smoke outlet opening at a periphery of the cover.

2. A smoke generating device for a barbecue grill having two burner tube sections in a lower section of the grill, the smoke generating device comprising:

a smoker box and a cover; and, the smoker box being adapted to engage with the two burner tube sections to support the smoker box such that the floor of the smoker box is horizontally disposed between the two burner tube sections.

3. The smoke generating device of claim 2 wherein the smoke generating device further comprises at least two supports which depend from the smoker box, each support having a recess adapted to receive one of the two burner tube sections.

4. The smoke generating device of claim 3 wherein each of the at least two supports engage the respective burner tube at least one point which is between adjacent ports of the burner tube.

5. The smoke generating device of claim 3 wherein the at least one support is thin and generally vertically oriented.

6. The smoke generating device of claim 2 wherein:

the smoker box is adapted to hold an at least one smoker particle;

the smoker comprises a floor having an at least one opening for receiving an air into the smoker box, the at least one opening having an inwardly protruding louver for promoting air circulation to the at least one smoker particle.

7. The smoke generating device of claim 2 wherein the smoke generating device further comprises:

an ignition bar having a first portion, a second portion, and a third portion; and, the first portion of the ignition bar extending into an interior space of the smoker box, the second portion of the ignition bar extending through a wall of the smoker box to an outside of the smoker box wherein the ignition bar is positioned to extend over one of the burner tube sections for transferring heat to the smoker box, and the third portion of the ignition bar extending through another wall of the smoker box to an outside of the smoker box wherein the ignition bar is positioned to extend over the other of the burner tube sections for transferring heat to the smoker box.

8. The smoke generating device of claim 7, wherein:

the smoker box is adapted to hold an at least one smoker particle;

the smoker comprises a floor having an at least one opening for receiving an air into the smoker box, the at least one opening having an inwardly protruding louver for elevating the at least one smoker particle off of the floor.

9. The smoke generating device of claim 8, wherein the smoker box has an at least one smoke outlet opening at the periphery of the cover.

10. A smoke generating device for a barbecue grill having a burner tube in a lower section of the grill, the smoke generating device comprising:

a smoker box, an ignition bar, and a cover;

the smoker box having a floor and a side wall;

the smoker box and cover defining an interior space;

the side wall being adapted to hold the ignition bar; and, a first portion of the ignition bar extending through a wall of the box into the interior space of the smoker box and a second portion of the ignition bar extending to an outside of the smoker box wherein the ignition bar is adapted to extend over the burner tube for transferring heat to the smoker box.

11. A smoke generating device for a barbecue grill in accordance with claim 10 wherein:

the floor has an opening for receiving an air into the smoker box, the opening having an inwardly protruding louver for elevating the at least one smoker particle off of the floor to promote circulation of air to the at least one smoker particle.

12. A smoke generating device for a barbecue grill in accordance with claim 11 wherein:

the floor of the smoker box is disposed in the lower section of the grill for receiving an air into the smoker box; and the cover of the smoker box has a lip which extends outwardly past the wall for receiving heat from the burner tube.

13. A smoke generating device for a barbecue grill in accordance with claim 10 wherein:

two parallel burner tube sections are disposed in the lower section of the grill.

14. A smoke generating device for a barbecue grill in accordance with claim 10 wherein:

the burner tube has a section with a plurality of spaced-apart ports, a smoker box having at least one support;

the at least one support being thin and generally vertically oriented; and, the at least one support being adapted to be disposed between two adjacent ports of the burner tube.

15. A smoke generating device for a barbecue grill in accordance with claim 10 wherein the ignition bar is positioned to extend over a first burner tube section for transferring heat to the smoker box, and a portion of the ignition bar extends through another wall of the smoker box to an outside of the smoker box wherein the ignition bar is positioned to extend over a second burner tube section for transferring heat to the smoker box.

16. The smoke generating device of claim 15 wherein the smoke generating device further comprises at least two supports which depend from the smoker box, each support having a recess adapted to receive one of the two parallel burner tube sections.

17. The smoke generating device of claim 16 wherein each of the at least two supports engage the respective burner tube at least one point which is between adjacent ports of the burner tube.

18. The smoke generating device of claim 16 wherein the at least one support is thin and generally vertically oriented.

19. The smoke generating device of claim 15 wherein:
the smoker box is adapted to hold an at least one smoker particle;
the smoker comprises a floor having an at least one opening for receiving an air into the smoker box, the at least one opening having an inwardly protruding louver for promoting air circulation to the at least one smoker particle.

20. The smoke generating device of claim 19 wherein the smoke generating device further comprises a cover for the smoker box, wherein the cover has a lip which extends outwardly past at least one of the walls of the smoker box for receiving heat from at least one of the burner tube sections.

* * * * *